Sept. 27, 1932.   A. DEWANDRE   1,879,892
FLUID BRAKING MECHANISM
Filed Dec. 20, 1928    2 Sheets-Sheet 1

Inventor:
A. Dewandre

Sept. 27, 1932.    A. DEWANDRE    1,879,892
FLUID BRAKING MECHANISM
Filed Dec. 20, 1928    2 Sheets-Sheet 2

INVENTOR.
ALBERT DEWANDRE
BY
ATTORNEYS.

Patented Sept. 27, 1932

1,879,892

UNITED STATES PATENT OFFICE

ALBERT DEWANDRE, OF LIEGE, BELGIUM

FLUID BRAKING MECHANISM

Application filed December 20, 1928, Serial No. 327,272, and in France December 21, 1927.

This invention is directed to an improvement in servo-motor braking mechanism wherein the servo-motor for operating the brakes is controlled through a manually governed distributor for the control of the servo-motor power.

The primary object of the present invention is the provision of a distributor to be interposed between the manually operable brake pedal and the brake applying elements, with such distributor including an inherent pressure element or elements directly influenced by the manual pressure on the pedal and constituting the means through which the servo-motor action is inaugurated following a predetermined manual pressure, and further providing a means to insure a constant and proportional reaction of the braking pressure against the foot of the operator to give the operator through such reaction a "feel" of control over the braking.

A further object of the invention is the utilization of the distributor in the mechanical path between the operator's foot pedal and the brake rodding to insure that the effort exerted by the operator will be added at all times to the force exerted by the servo-brake to thus provide a complete mechanical control over the brakes in the event of the failure of the servo-motor.

A further object of the invention is the provision of a deformable pressure chamber or chambers having a predetermined or selected internal pressure and providing the pressure responsive element or elements between the operator's foot pedal and the brake rodding, such chambers providing for the positioning of a valve element under pedal pressure, with such valve element controlling the power application to the servo motor proper under a pedal pressure in excess of the internal pressure of the element or elements, with such element or elements constituting at all times a positive reaction on the foot of the operator incident to the internal pressure of such element or elements, together with the function of utilizing the internal pressure of such element or elements to cut off the power to the servo-motor proper in the event of the holding of the operator's foot pedal in any predetermined brake-applying position.

Another object of the present invention is the utilization of the pressure element or elements as the sole means for controlling the manual application of the braking pressure through the foot pedal and the sole means for controlling the application of the servo-motor brake operation to thereby provide through the control of the internal pressure of such element or elements a definite point up to which the brakes are applied manually and mechanically through the foot pedal and beyond which the brakes are additionally applied through the service of the servo-motor proper.

The invention is illustrated in the accompanying drawings, wherein:—

Figure 1:
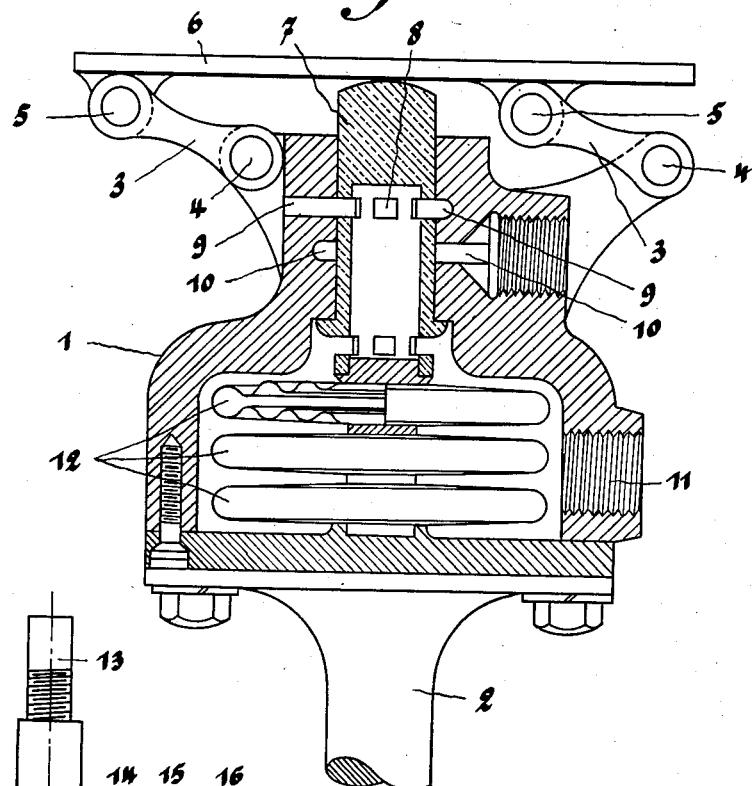
Figure 1 is a view in vertical section, partly in elevation, showing the improved distributor forming a direct part of the brake pedal.
Figure 4:
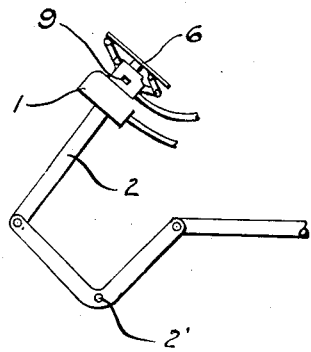
Figure 4 is a view illustrating the extension of the distributor and pedal mounting of Figure 1 for the operation of the brakes shown in Figure 3.

In the form shown in Figures 1 and 4, the improved distributor comprises a casing 1 removably secured to the upper end of what may be called a conventional brake lever 2. The foot piece 6 in this form is shown as supported on links 3 pivotally connected at 4 to arms projecting from the casing 1, the links being pivotally connected to the foot piece 6 at 5. The casing 1 is reduced in its upper portion to provide a cylindrical bearing to slidably receive a valve 7. This valve extends through the upper end of the casing 1 and bears beneath the foot piece 6, being directly responsive to manual movements of the latter. The valve near its lower end has a lateral offset 7' to cooperate with shoulders 8' formed in the casing to limit the upward movement of the valve. The valve is of hollow formation throughout the greater portion of its length, being formed near its upper end with ports 8 which, when the valve is in upper or normal position, directly communicate with an annular passage 9 in the valve casing, which passage at one point opens through the casing to the atmosphere, as shown. The lower portion of the valve below the lateral projection 7' is formed with a series of ports 11' which open into the interior of the casing below the cylindrical valve guide.

Mounted within the casing below the lower end of the valve 7 is one or more deformable chambers 12, preferably constructed of metal, corrugated concentrically as shown, or obviously made up of plate of any appropriately flexible material. These chambers, which will be hereinafter termed the pressure elements and of which there may obviously be one or more as desired, are designed to bear a predetermined internal pressure, and as this pressure is the controlling element for applying the servo-motor power to the brake rodding under manual pressure on the foot piece 6, it will be understood that by predetermining the pressure within the pressure elements, that point in the manual application of the brakes at which the servo motor goes into operation may be readily predetermined.

Figure 3:
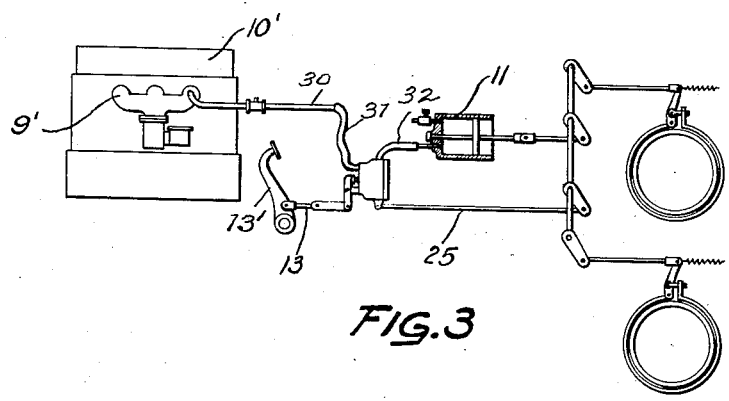
Figure 3 is a view illustrating the application of the form shown in Figure 2 to the servo-motor and brakes and showing the servo-motor actuated by the suction of the engine.

The casing 1 below the atmospheric vent 9 is formed with a further annular channel 10 which leads through the wall of the casing and is there provided for the connection of a pipe 30 made up in part of a flexible section 31 which leads to the manifold 9' of the engine 10' for the production of suction, as is well understood in the operation of this type of brake. The casing 1 in that portion in which the pressure elements are located is further formed with an opening 11 communicating with the interior of the casing and formed for the reception of a pipe 32 which opens into the cylinder of a conventional servo-motor 11, the piston of which is connected to the brakes by appropriate mechanical means, as illustrated in Figure 3.

It will be understood, as previously stated, that the internal pressure of the pressure elements is that determined upon for controlling the application of the servo-motor power to the brakes, and under this internal pressure of the pressure elements it will be apparent that the valve 7 is normally maintained in inoperative position, that is, with the opening 8 in such valve in direct communication with the atmospheric port 9. In applying the brakes, the operator exerts the requisite pressure upon the foot piece 6. If this pressure is equal to or less than that internal pressure selected for the pressure elements, it is apparent that such movement of the foot piece 6 will exert a direct braking pressure upon the casing 1 and, therefore, through the pedal 2 and connected linkage indicated at 2' in Figure 4, operate the brake rodding to set the brakes.

As the force exerted by the operator upon the foot piece 6 operates the internal resistance pressure of the pressure elements 12, there is a tendency of movement in the valve 7 relative to the casing 1 until, when the foot piece pressure overcomes the internal pressure of the pressure elements, the valve 7 is brought into registry with the suction port 10 so that the suction created in the manifold of the engine is open to the servo-motor 11 through the pipes 30 and 31, port 10, valve port 8, valve ports 11', casing opening, pipe 32, and servo-motor cylinder. Thereupon the servo-motor is brought into action and the brakes applied through the mechanical details illustrated in Figure 3.

When the desired braking force or power is reached, further movement of the foot piece 6 is, of course, interrupted, as the operator no longer continues to increase his pressure on the foot piece but maintains it at the particular desired point. There is, therefore, no further operative movement of the valve 7, but as the internal pressure of the pressure elements has been, in fact, theoretically increased by the reduction of the pressure in the casing surrounding said elements incident to the suction through the port 10, it is apparent that the casing 1 will advance relative to the slide valve and thus the suction port 10 will be moved out of registry with the valve port 8 and the suction effect upon the servo-motor proper is immediately interrupted and the brakes are held with the predetermined braking force. If further braking power is necessary, further pressure is applied to the foot piece 6, re-establishing communication between the suction port 10 and the valve port 8 and the servo-motor is further operated for further braking. If the brakes are to be released, pressure upon the foot piece 6 is withdrawn, whereupon the internal pressure of the pressure elements immediately restores the valve 7 to normal position, establishing communication between the servo-motor proper and the atmosphere through the port 9 and the brakes are fully released.

The characteristic feature of the present improvement resides in the utilization of the internal pressure of the pressure elements as a reactive force on the foot piece controlled by the foot of the operator. This reaction is to be desired in order that the operator may know through this "feel" as to the power application of the brakes. This responsive internal pressure of the pressure elements is at all times and under all conditions directly effective on the foot piece 6 under any mechanical pressure on said foot piece. This reaction is thus at all times proportional to the braking force, giving the operator the desired "feel" of the brakes and compelling the operator to exert an equal force to overcome this internal pressure of the pressure elements, as otherwise the casing 1 would continue to advance and close the suction port 10. The reaction exerted by the pressure elements 12 will be at all times proportional to the intensity of the braking action, and it is only by overcoming this internal pressure of such pressure elements that the servo-motor is utilized as a braking means, and if at any time during the braking action the pressure on the foot piece 6 is interrupted, the pressure elements 12 act to cut off the suction communication with the servo-motor and hold the brakes at the predetermined point.

Figure 2:
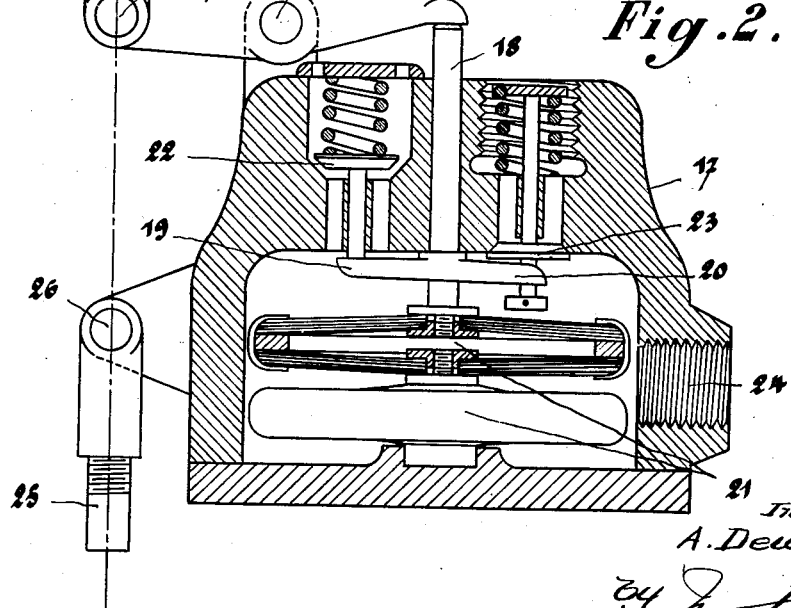
Figure 2 is a similar view of a modified form wherein the distributor is arranged between the pedal and the brake rodding.

In Figure 2, there is illustrated a slight modification in which the ordinary brake pedal 13' is connected to and operates a rod 13, which is in turn pivotally connected at 14 to one end of a lever 15 pivotally supported intermediate its ends at 16 to a casing 17. The opposite end of the lever 15 bears upon a rod 18 which extends through the casing 17 and into a chamber in the latter, in which is arranged one or more internal pressure elements 21 corresponding to the elements 12 of the preferred form. The rod 18 is connected within the casing to a double-armed lever, one arm 19 of which controls an upwardly opening spring-pressed atmospheric governing valve 22 which controls ports leading to the interior of the casing and open to the atmosphere, the remaining arm 20 of such lever controlling a suction port valve 23. The port controlled by the valve 23 is to be connected to the suction through pipes 31 and 30, as in the preferred form. The atmospheric valve opens upwardly and the suction valve downwardly with respect to the casing, and as these valves are spring-pressed in closing direction, a downward movement of the rod 18 permits the atmospheric valve 22 to close and the suction valve 23 to open. The casing 17 is formed with the port 24 which communicates through the pipe 32 with the servo-motor 11, as in the preferred form.

The operaton and also the reaction exerted by the chambers will remain the same as for the distributor shown in Figure 1. In the case shown in Figure 1, the casing was, so to speak, driven by the driver's foot, while in the case shown in Figure 2 it follows its movement. In both cases, the foot controls the ports in one direction, while the displacement of the rodding controls them in the other direction; it will naturally be necessary to employ flexible ducts or pivotally joined piping.

In the case of failure of the operation of the servo brake, the driver will still have at his control the ordinary mechanical brake, because in Figure 1 the distributor is situated upon the pedal and in Figure 2, as the rod 13 is connected to the distributor upon which is secured the rod 25 leading to the rodding, these rods act upon the brakes like a single rod and at all times the force exerted by the foot will be added to the action exerted by the servo brake.

What is claimed as new is:—

1. An automotive power brake system including a casing, manually actuated brake operating means of which the casing forms a part, a servo-motor connected to the brakes, suction means leading through the interior of the casing for controlling the operation of the servo-motor, an atmospheric vent for the servo-motor leading through the interior of the casing, manually operable means for controlling the suction means to the motor and the atmospheric vent thereof, and a bellows element forming a power connection between said manually operable means and the casing, the bellows element being exteriorly open to the suction admitted to the servo-motor and having a predetermined interior pressure to compel movement of the casing in the actuation of the manually operable means at any pressure less than said predetermined pressure within the bellows element, the predetermined interior pressure of the bellows element being of increased effect on the bellows under the admission of suction through the casing to the servo-motor whereby to create a reaction on the manually operable means by said bellows element under the increased effect of the predetermined inner pressure in proportion to the suction effect on the servo-motor.

2. In an automotive power brake system, a casing forming an element of a mechanical braking means, a servo-motor operating the brakes, a passage including the interior of the casing through which the servo-motor is subjected to a suction, a passage including the interior of the casing through which the servo-motor is subject to the atmosphere, a manually operable element for controlling said passages, and a bellows member interposed between the element and casing and interiorly subjected to a predetermined pressure, the interior pressure of the bellows causing the bellows to serve as a rigid connection between the manually operable element and the casing to compel movement of the casing under any pressure on the element less than that within the bellows, the interior pressure on the bellows due to pressure on the manually operable element in excess of the internal pressure of the bellows serving when the operable element is operated to admit suction to the servo-motor to create a reaction on the manually operable element.

In witness whereof I affix my signature.

ALBERT DEWANDRE.